US008829907B2

(12) United States Patent
Signorelli et al.

(10) Patent No.: US 8,829,907 B2
(45) Date of Patent: Sep. 9, 2014

(54) FREQUENCY FILTERING AND ADJUSTMENT OF ELECTROMAGNETICALLY RECEIVED SIGNALS FROM ANTENNAS

(75) Inventors: Jack Signorelli, Cypress, TX (US); Sheng Fang, Houston, TX (US); Samuel Bell, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 397 days.

(21) Appl. No.: 12/883,344

(22) Filed: Sep. 16, 2010

(65) Prior Publication Data

US 2011/0068796 A1    Mar. 24, 2011

Related U.S. Application Data

(60) Provisional application No. 61/243,725, filed on Sep. 18, 2009.

(51) Int. Cl.
*G01V 3/00* (2006.01)
*G01V 3/30* (2006.01)

(52) U.S. Cl.
CPC ........................................ *G01V 3/30* (2013.01)
USPC ........... 324/338; 324/346; 324/348; 327/156; 327/443; 340/690; 340/853.1; 342/22; 702/7; 702/8; 702/10

(58) Field of Classification Search
CPC ........... G01V 1/00; G01V 1/003; G01V 1/02; G01V 1/21; G01V 1/24; G01V 1/40; G01V 3/00; G01V 3/12; G01V 3/18; G01V 3/36; G01V 3/34
USPC .......................... 324/323–375; 175/45; 367/76
See application file for complete search history.

(56) References Cited

U.S. PATENT DOCUMENTS

| 3,930,220 | A | * | 12/1975 | Shawhan | 367/82 |
| 4,663,744 | A | * | 5/1987 | Russell et al. | 367/76 |
| 5,389,881 | A | * | 2/1995 | Bittar et al. | 324/338 |
| 5,467,832 | A | * | 11/1995 | Orban et al. | 175/45 |
| 6,087,833 | A | * | 7/2000 | Jackson | 324/348 |
| 6,777,940 | B2 | * | 8/2004 | Macune | 324/338 |
| 6,791,330 | B2 | * | 9/2004 | McCormick | 324/338 |
| 7,038,455 | B2 | | 5/2006 | Beste et al. | |
| 7,482,812 | B2 | * | 1/2009 | Moore | 324/338 |

OTHER PUBLICATIONS

Fang, Sheng and Jack Signorelli, "Multi-Frequency Acquisitions with the Combination of Heterodyning Techniques and FFT," Jun. 26 2007, pp. 1-12.Prior Art Database.
Hunka, J.F.. A New Resistivity Measurement System for Deep Formation Imaging and High-Resolution Formation Evaluation, Conference Paper, Sep. 23-26, 1990, 295-307, Society of Petroleum Engineers.

* cited by examiner

*Primary Examiner* — Arleen M Vazquez
*Assistant Examiner* — Son Le
(74) *Attorney, Agent, or Firm* — Cantor Colburn LLP (57) ABSTRACT

An apparatus for estimating a property of an earth formation penetrated by a borehole, the apparatus having: a carrier configured to be conveyed through the borehole; a transmitter disposed at the carrier and configured to transmit electromagnetic energy at a first frequency into the formation; a first antenna disposed at the carrier and configured to receive electromagnetic signals from the formation as a result of the transmitted electromagnetic energy interacting with the formation; and an active filter coupled to the antenna and configured to filter electromagnetic signals received by the antenna to let the electromagnetic signals at the first frequency pass for processing to estimate the property.

21 Claims, 5 Drawing Sheets

FIG. 4

FREQUENCY FILTERING AND ADJUSTMENT OF ELECTROMAGNETICALLY RECEIVED SIGNALS FROM ANTENNAS

CROSS-REFERENCE TO RELATED APPLICATIONS AND PRIORITY CLAIM

This application claims the benefit of U.S. Provisional Application Ser. No. 61/243,725, entitled "FREQUENCY FILTERING AND ADJUSTMENT OF ELECTROMAGNETICALLY RECEIVED SIGNALS FROM ANTENNAS", filed Sep. 18, 2009, under 35 U.S.C. §119(e), which is incorporated herein by reference in its entirety.

BACKGROUND OF THE INVENTION

1. Field of the Invention

The present invention relates to the analysis of an underground earth formation and, more particularly, to receiving signals from the formation to estimate the resistivity of the formation.

2. Description of the Related Art

Exploration and production of hydrocarbons requires accurate and reliable measurements of a geologic formation, which may contain a reservoir of the hydrocarbons. In general, a borehole is drilled into the earth to gain access to the formation to perform the measurements. Measurements performed in the borehole are generally referred to as well logging.

In one embodiment of well logging referred to as logging-while-drilling or measurement-while-drilling, a logging instrument or tool is disposed at a bottom hole assembly at the distal end of a drill string. As the drill string rotates to drill the borehole, the logging tool performs the measurements. The measurements are generally logged with a depth at which they were performed. Together, the measurements and associated depths create a well log. The well log may be presented graphically or as an image.

One type of downhole measurement is of electrical properties of the earth formation. The electrical properties provide information about the geologic materials that make up the formations, and about their likely oil, gas and water content.

The electrical properties of the earth formation may be measured by an induction well logging technique. In induction well logging, a transmitter emits electromagnetic energy into the formation. The changing magnetic fields associated with the energy induces alternating circulating currents in the formation. The alternating circulating currents in turn emit electromagnetic energy that is received by a receiver via an antenna. Characteristics of the received electromagnetic energy are then related to the electrical properties of the formation.

In conventional well logging tools, the antenna may be tuned to specific frequencies. This tuning produces resonant frequencies with high Q for optimal performance. In general, the antenna is tuned using fixed value components such as resistors, capacitors and inductors. For protection, these components are usually mounted in a junction box or located under a protective sleeve near the receiving antenna. Because of the limited space available in a while-drilling tool, the junction box may be mounted in a cut-out of a steel structure of the tool.

Unfortunately, the conventional induction logging tool using a tuned antenna can have some drawbacks. One drawback is the need for the cut-out which increases the chances for corrosion and cracking in the tool structure. Another drawback is that the additional separate tuning circuitry adds more components to increase the chance of failure and, thus, increased time and cost required in a maintenance shop.

Therefore, what are needed are techniques to increase the reliability and performance of induction well logging tools.

BRIEF SUMMARY OF THE INVENTION

Disclosed is an apparatus for estimating a property of an earth formation penetrated by a borehole, the apparatus having: a carrier configured to be conveyed through the borehole; a transmitter disposed at the carrier and configured to transmit electromagnetic energy at a first frequency into the formation; a first antenna disposed at the carrier and configured to receive electromagnetic signals from the formation as a result of the transmitted electromagnetic energy interacting with the formation; and an active filter coupled to the antenna and configured to filter electromagnetic signals received by the antenna to let the electromagnetic signals at the first frequency pass for processing to estimate the property.

Also disclosed is a method for estimating a property of an earth formation penetrated by a borehole, the method including: transmitting electromagnetic energy at a first frequency into the formation using a transmitter; receiving electromagnetic signals from the formation as a result of the transmitted electromagnetic energy interacting with the formation using a first antenna; and filtering electromagnetic signals received by the first antenna with an active filter to let the electromagnetic signals at the first frequency pass for processing to estimate the property.

Further disclosed is a non-transitory machine-readable medium having machine-executable instructions for estimating a property of an earth formation penetrated by a borehole by implementing a method including: transmitting electromagnetic energy at a first frequency into the formation using a transmitter; receiving electromagnetic signals from the formation as a result of the transmitted electromagnetic energy interacting with the formation using a first antenna; and filtering electromagnetic signals received by the first antenna with an active filter to let the electromagnetic signals at the first frequency pass for processing to estimate the property.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are embodiments of techniques for increasing the reliability and performance of an induction well logging tool configured to estimate an electrical property of an earth formation. The techniques, which include apparatus and method, call for using an untuned antenna to receive electromagnetic energy signals (referred to as electromagnetic signals) from an earth formation in which alternating circulating currents were induced at a specific frequency. Because the antenna is untuned, the received signals can pick up an untold amount of noise and harmonics unrelated to the electrical property being sought. With these techniques, the electromagnetic signals received by the untuned antenna are filtered to allow the signals at the specific frequency or a limited range about the specific frequency to pass for processing and analysis.

In one embodiment, electrical properties of the earth formation can be measured at several frequencies. A controller used to direct a transmitter to transmit electromagnetic energy at a first frequency into the earth formation also directs filter circuitry to allow passing of received electromagnetic signals at the first frequency. The passed signals are then processed and analyzed to estimate the electrical property of the formation. As a next step, the controller can then direct the transmitter to transmit electromagnetic energy at a second frequency into the earth formation and direct the filter circuitry to allow passing of received electromagnetic energy signals at the second frequency. As with the passed electromagnetic signals at the first frequency, the passed electromagnetic energy signals at the second frequency are processed and analyzed to estimate the electrical property of the formation. Any number of frequencies may be used to estimate the electrical properties of the formation.

Figure 1:
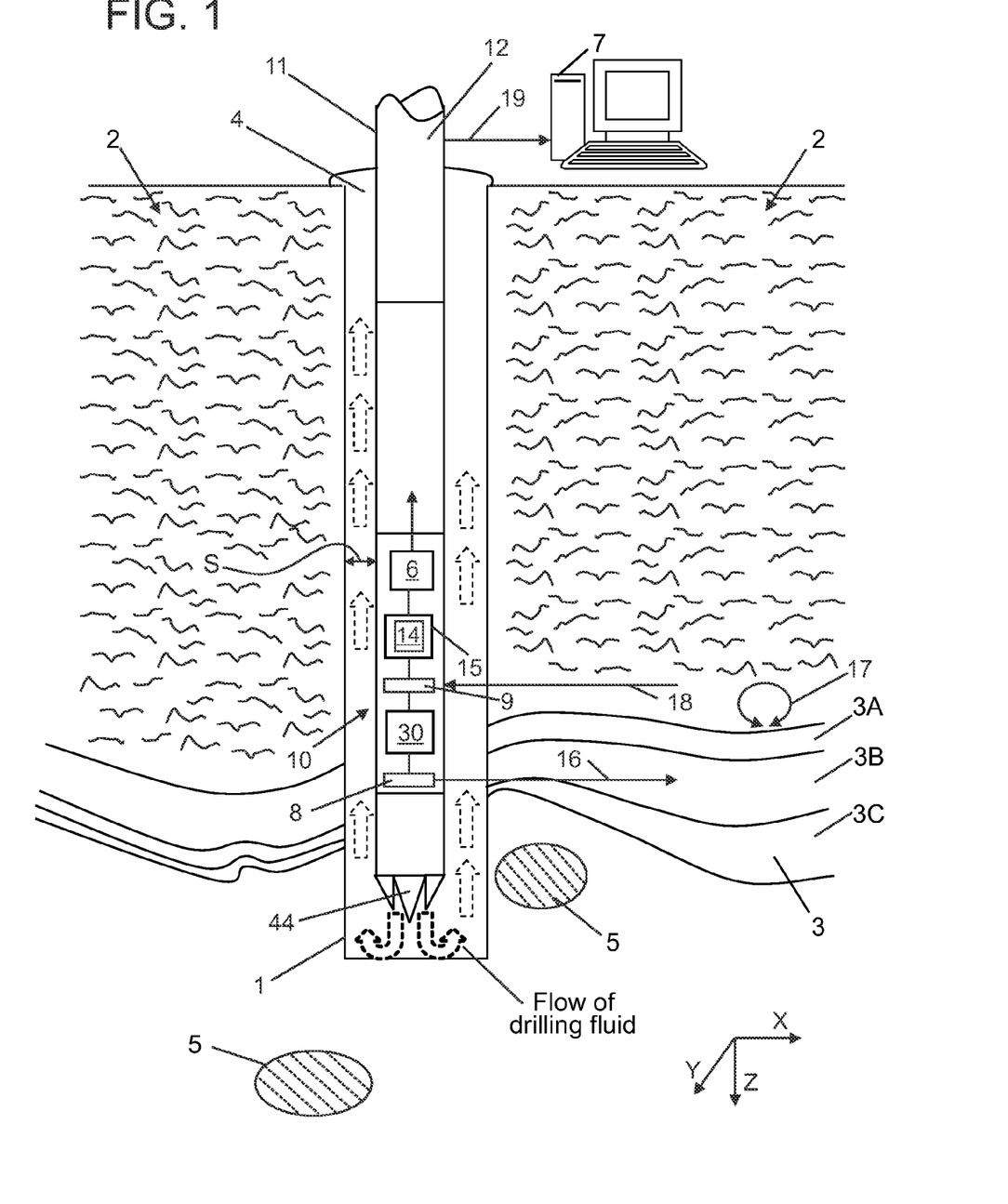
FIG. 1 illustrates an exemplary embodiment of a drill string that includes a logging instrument.

Reference may now be had to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by drilling rig components (not shown) which, among other things, provides rotational energy and downward force. The wellbore 1 generally traverses sub-surface materials, which may include a formation 3 (shown with layers 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as fluids, gases, liquids, and the like.

The drill string 11 includes lengths of drill pipe 12 which drive a drill bit 44. In this example, the drill bit 44 also provides a flow of a drilling fluid 4, such as drilling mud. The drilling fluid 4 is often pumped to the drill bit 44 through the drill pipe 12, where the fluid exits into the wellbore 1. This results in an upward flow of drilling fluid 4 within the wellbore 1. The upward flow generally cools the drill string 11 and components thereof, carries away cuttings from the drill bit 44 and prevents blowout of pressurized hydrocarbons 5.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD), or "logging while drilling" (LWD). Performing MWD or LWD generally calls for operation of a logging instrument (or tool) 10 that is incorporated into the drill string 11 and designed for operation while drilling or during a temporary halt in drilling. Generally, the MWD logging instrument 10 is coupled to an electronics package, which is also on board the drill string 11, and therefore referred to as "downhole electronics 6." Generally, the downhole electronics 6 provides for at least one of operational control and data analysis. Often, the MWD logging instrument 10 and the downhole electronics 6 are coupled to a surface processing system 7. The surface processing system 7 may be included to further control operations, provide greater analysis capabilities as well as data logging and the like. A communications channel (not shown) may provide for communicating data 19 between the downhole electronics 6 and the surface processing system 7, and may operate via pulsed mud, wired pipe, and other technologies as are known in the art.

Still referring to FIG. 1, the logging tool 10 includes a transmitter antenna 8 coupled to a transmitter 30, which may be included in the downhole electronics 6 or as a separate device. The transmitter 30 and the transmitter antenna 8 are configured to transmit electromagnetic energy 16 at a specific frequency into the formation 3. The electromagnetic energy 16 induces circulating currents 17, which may also be referred to as eddy currents, in the formation 3. The circulating currents 17 in turn emit electromagnetic signals 18 at or near the specific frequency of the electromagnetic energy 16. The electromagnetic signals 18 are received by a receiver antenna 9 at the logging tool 10. The electromagnetic signals 18 have characteristics that are related to a property of the formation 3. The property may be resistivity or its inverse conductivity. The property may also be a location of a boundary between layers of the formation 3.

The receiver antenna 9 is an untuned wideband antenna and, therefore, may be modeled as an inductance, $L_{RA}$. As such, the receiver antenna 9 in addition to receiving the electromagnetic signals 18 also receives unwanted electromagnetic signals such as noise and harmonics at frequencies different from the specific frequency. Because the unwanted electromagnetic signals provide no useful information about the formation 3, an active filter 14 is used to filter out the unwanted electromagnetic signals.

Still referring to FIG. 1, the receiver antenna 9 is coupled to the filter 14, which is included in a receiver 15. The filter 14 is configured to filter out the unwanted electromagnetic signals from all electromagnetic signals received by the antenna 9. Thus, the electromagnetic signals 18 are allowed to pass through the filter 14 for further processing and analysis. In order to filter out the unwanted electromagnetic signals, the filter 14 is configured to only allow the received signals at the specific frequency or in a limited range about the specific frequency to pass. In general, the highest magnitude of the electromagnetic signals passed through the filter 14 is centered of the specific frequency of the transmitted electromagnetic energy 16. As shown in FIG. 1, the receiver 15 is coupled to the downhole electronics 6 for operation and/or communication purposes.

While the embodiment of FIG. 1 illustrates one receiver antenna 9, the illustrated antenna 9 and associated train of components is intended to represent one or more receiver antennas and associated trains of components. When two or more receiver antennas are used, amplitude and/or phase differences between the electromagnetic signals received by the receiver antennas may be measured and related to a property of the formation 3.

Figure 2:
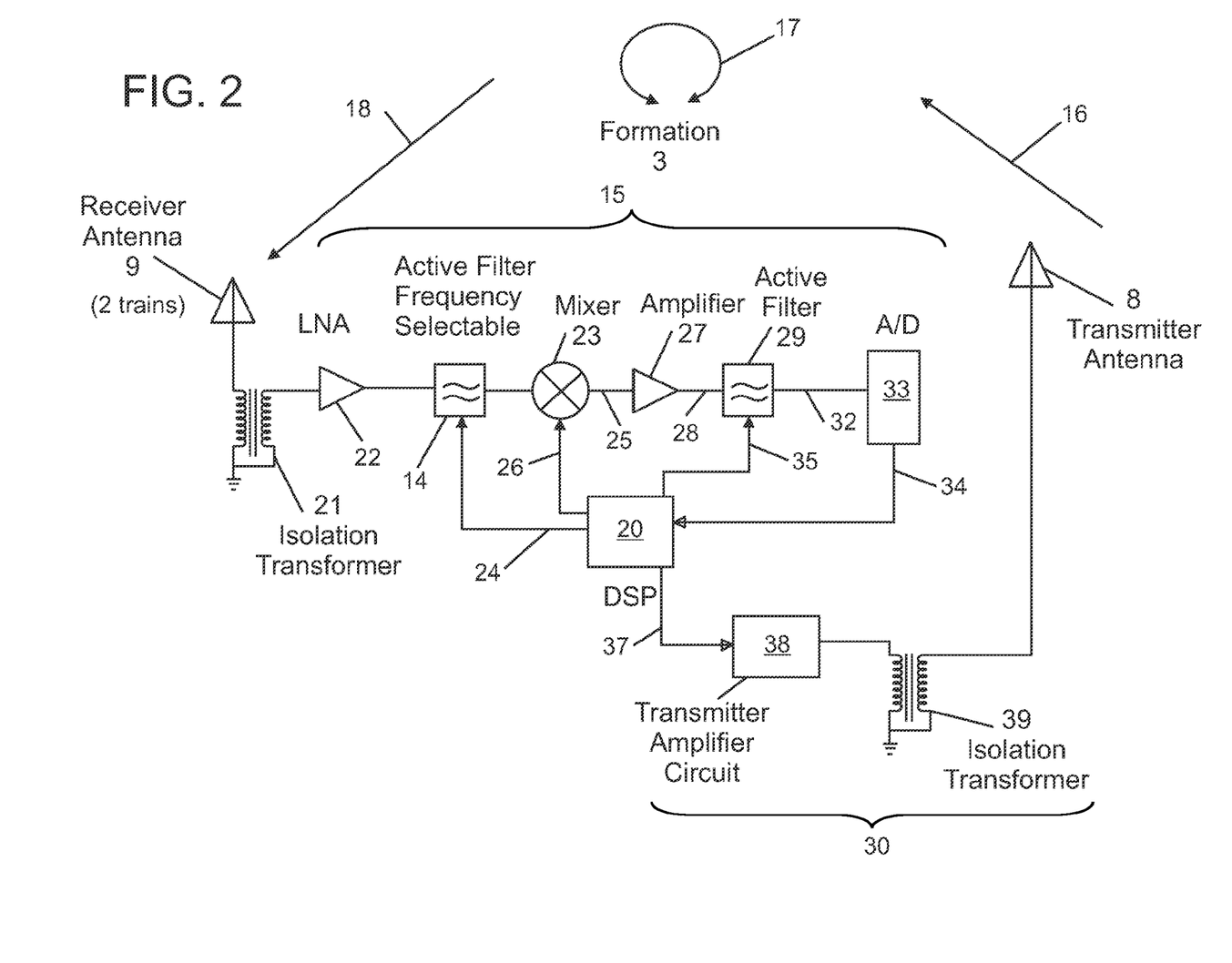
FIG. 2 depicts aspects of a receiver and a transmitter disposed at the logging instrument.

Reference may now be had to FIG. 2. FIG. 2 depicts aspects of the receiver 15 and the transmitter 30 in more detail. In the embodiment of FIG. 2, two receiver antennas 9 are used to receive the electromagnetic signals 18. Thus, each antenna 9 may require a train of downstream components although only one train is shown in FIG. 2. For discussion purposes, only one train of downstream components is presented.

Referring to FIG. 2, the receiver 15 is coupled to the receiver antenna 9. The receiver 15 includes a transformer 21 coupled to the receiver antenna 9. The transformer 21 is configured to decouple receiver components from a zero frequency electric field that may be received by the antenna 9. Coupled to the transformer 21 is a low-noise amplifier 22 that amplifies the electromagnetic signals 18 and any unwanted electromagnetic signals received by the antenna 9. The low noise amplifier 22 generally has a noise rating of about five nanoV/√Hz or less. Output from the low-noise amplifier 22 is input into the filter 14.

The filter 14 filters the received electromagnetic signals to allow the electromagnetic signals 18 to pass and to block the unwanted electromagnetic signals received by the receiver antenna 9. The electromagnetic signals 18 are allowed to pass through the filter 14 because the filter 14 is configured to allow those received electromagnetic signals having a frequency substantially the same as the frequency of the transmitted electromagnetic energy to pass.

In one embodiment, the filter 14 receives a filter control signal 24 for operating the filter 14 as shown in FIG. 2. The filter control signal 24 can include a frequency (i.e., a pass frequency) or frequencies of received electromagnetic signals that the filter 14 will pass. In this way, the filter 14 can pass through the electromagnetic signals 18 that coordinate with the specific frequency or frequencies at which the electromagnetic energy 16 is transmitted.

Figure 3:
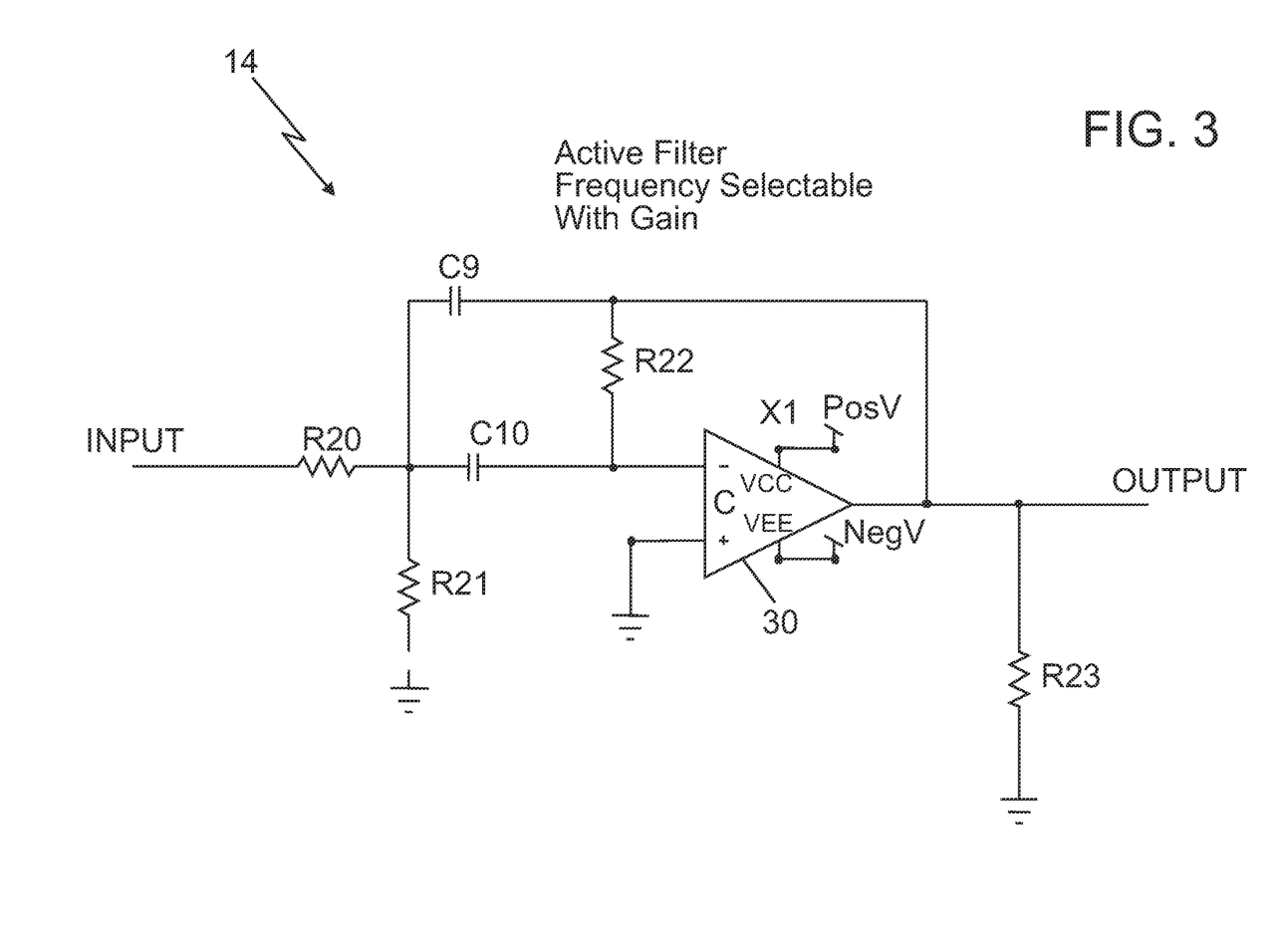
FIG. 3 depicts a schematic representation of a filter configured to filter received electromagnetic signals.

FIG. 3 depicts a schematic representation of the filter 14. The filter 14 includes components such as resistor, capacitors and/or inductors (not shown) that can have their values adjusted to allow electromagnetic signals of a selected pass frequency to pass. Alternatively or in addition, filter components can be switched in or out of the filter circuitry in order to achieve the selected pass frequency. In one embodiment, active components such as field effect transistors configured to resonate at a particular frequency can be used to configure the pass frequency of the filter 14. The filter 14 also includes an active component 30. The active component 30, such as an amplifier, is configured to amplify (i.e., apply gain) to the electromagnetic signals at the pass frequency. Applying gain to the passed electromagnetic signals 18 increases the amplitude of the passed signals 18 at the pass frequency relative to signal tails that are not at the pass frequency. Thus, the passed electromagnetic signals 18 centered on the pass frequency have a much greater magnitude than the signal tails that deviate from the pass frequency.

Figure 4:
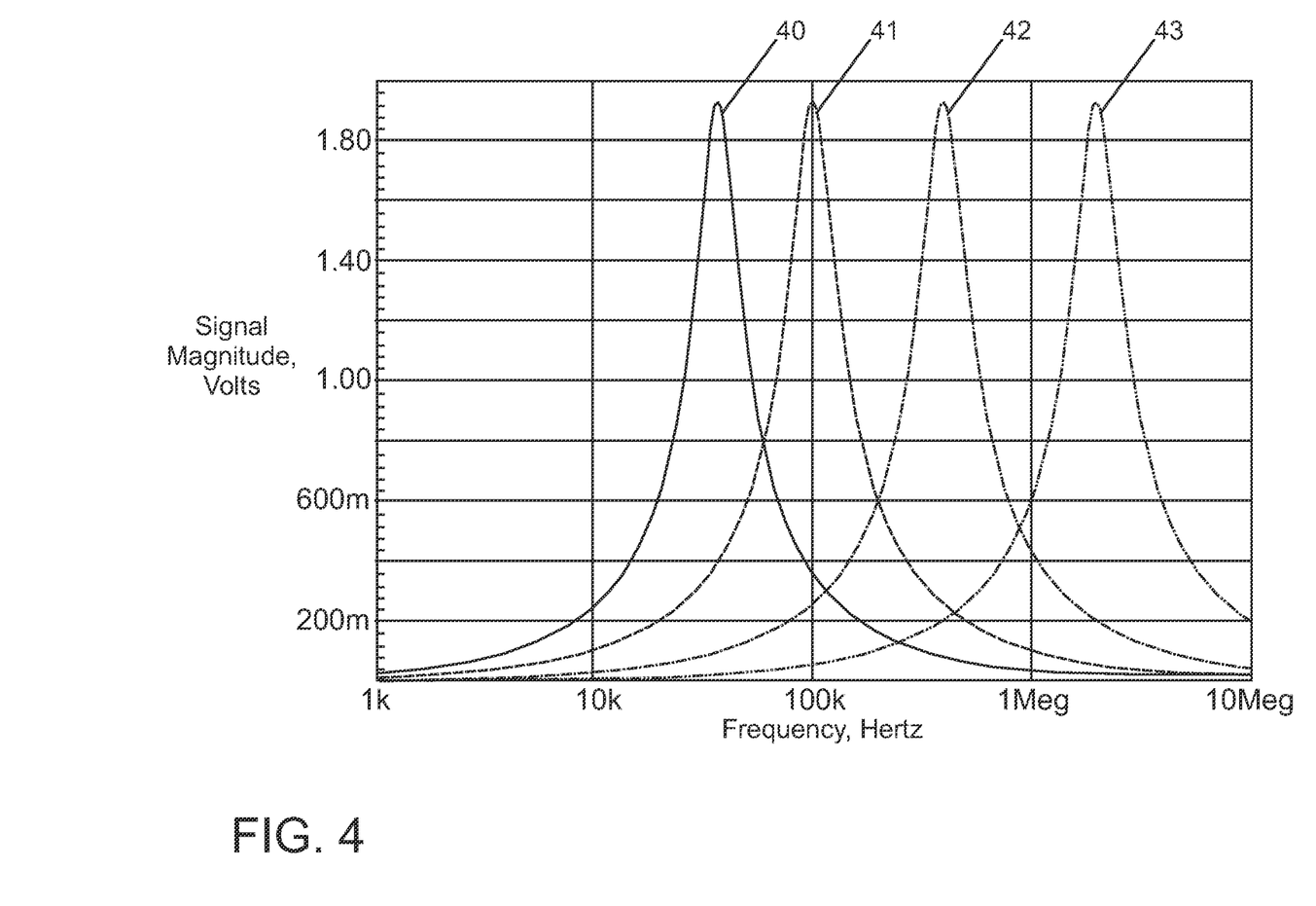
FIG. 4 depicts aspects of the electromagnetic signals that pass through the filter.

Shown in FIG. 4 are the electromagnetic signals 18 that passed through the filter 14 at 100 KHz (signal 41), 400 KHz (signal 42), and 2 MHz (signal 43). These signals coordinate with the electromagnetic energy 16 that was transmitted at 100 KHz, 400 KHz, and 2 MHz respectively. It is noted that the peak of each passed signal at the pass frequency is significantly higher than the signal tails of each passed signal not at the pass frequency.

Referring back to FIG. 2, a mixing circuit 23 is coupled to the filter 14. The mixing circuit 23 receives the electromagnetic signals that pass through the filter 14, i.e., the electromagnetic signals 18. To obtain information related to an electrical property of the formation 3 from the electromagnetic signals 18, characteristics of the electromagnetic signals 18 are measured. In order to readily measure the characteristics of the electromagnetic signals 18, the mixing circuit 23 mixes an oscillating signal having a fixed frequency with the electromagnetic signals 18 to produce audio signals 25 that can be accurately and precisely measured. The audio signals 25 are generally within an audio range such as 1 to 40 KHz as a non-limiting example. The frequency of the audio signals 25 is related to the difference in frequency between the electromagnetic signals 18 and the fixed frequency. Thus, the frequency of the audio signals 25 can be much less than the frequency of the electromagnetic signals 18. For example, the signal 43 at 2 MHz can be mixed with the oscillating signal at a fixed frequency of 1.964 MHz to produce the audio signal 25, shown as signal 40 in FIG. 4, at 36 KHz. The audio signal 40 includes the characteristics of the electromagnetic signal 43 related to a property of the formation 3. In general, magnitude and/or phase differences in two trains of the signal 40 are measured to estimate the property.

In one embodiment, the oscillating signal in the mixing circuit 23 has one or more fixed frequencies. In another embodiment, the mixing circuit 23 receives a mixing circuit control signal 26 as shown in FIG. 2. The mixing circuit control signal 26 can include a frequency or frequencies at which the oscillating signal operates. In this way, the frequency of the oscillating signal can be coordinated with the specific frequency of the transmitted electromagnetic energy 16 in order to produce the audio signals 25 that are optimized for being measured.

Still referring to FIG. 2, an audio amplifier 27 receives and amplifies the audio signals 25 to provide amplified audio signals 28. Because the mixing circuit 23 can introduce harmonics and other noise, the amplified audio signals 28 are filtered by an active audio filter 29. The active audio filter 29 filters and amplifies the amplified audio signals 28 allowing the amplified audio signals 28 at an audio pass frequency to pass through the filter 29. The audio pass frequency is an audio frequency that relates to the pass frequency of the filter 14 after the oscillating signal at the fixed frequency is mixed with signals at the pass frequency. The output of the active audio filter 29 is referred to as filtered audio signals 32. The filtered audio signals 32 are in a form that can be digitized for further processing.

In one embodiment, the audio pass frequency or frequencies may be pre-programmed into the active audio filter 29. In another embodiment, the active audio filter 29 receives an audio filter control signal 35 (as shown in FIG. 2) that includes the audio pass frequency at which the filter 29 is to operate.

Still referring to FIG. 2, an analog to digital converter (ADC) 33 converts the filtered audio signals 32 to digital signals 34. The digital signals 34 are then transmitted to a controller 20, which may store the digital signals 34 in memory and/or transmit the digital signals 34 to the surface processing system 7 via the downhole electronics 6.

In addition to storing the digital signals 34, the controller 20 can provide the filter control signal 24 to the filter 14, the mixing circuit control signal 26 to the mixing circuit 23, and the audio filter control signal 35 to the active audio filter 29.

In addition to controlling aspects of receiver 15, the controller 20 can also control aspects of the transmitter 30. For example, the controller 20 can send a transmitter control signal 37 (as shown in FIG. 2) to a transmitter amplifier 38. The transmitter control signal 37 directs the transmitter amplifier 38 to transmit the electromagnetic energy 16 at a selected frequency. In one embodiment, the controller 20 can direct the transmitter amplifier 38 to transmit the electromagnetic energy 16 at a plurality of frequencies. In one embodiment, the controller is configured to direct the transmitter to stop transmitting the electromagnetic energy at the first frequency and to direct the filter to stop allowing the received electromagnetic signals at the first frequency to pass. In one embodiment, functions of the controller 20 are controlled by a digital signal processor. In one embodiment, the controller 20 can be pre-programmed and/or receive instructions from the surface processing unit 7.

Still referring to FIG. 2, a transmitter isolation transformer 39 is used to decouple the transmitter antenna 8 from a zero-frequency electric field in the transmitter amplifier 38.

The receiver components depicted in FIG. 2 can be installed on a single receiver circuit board to improve reliability and reduce maintenance time and cost.

Figure 5:
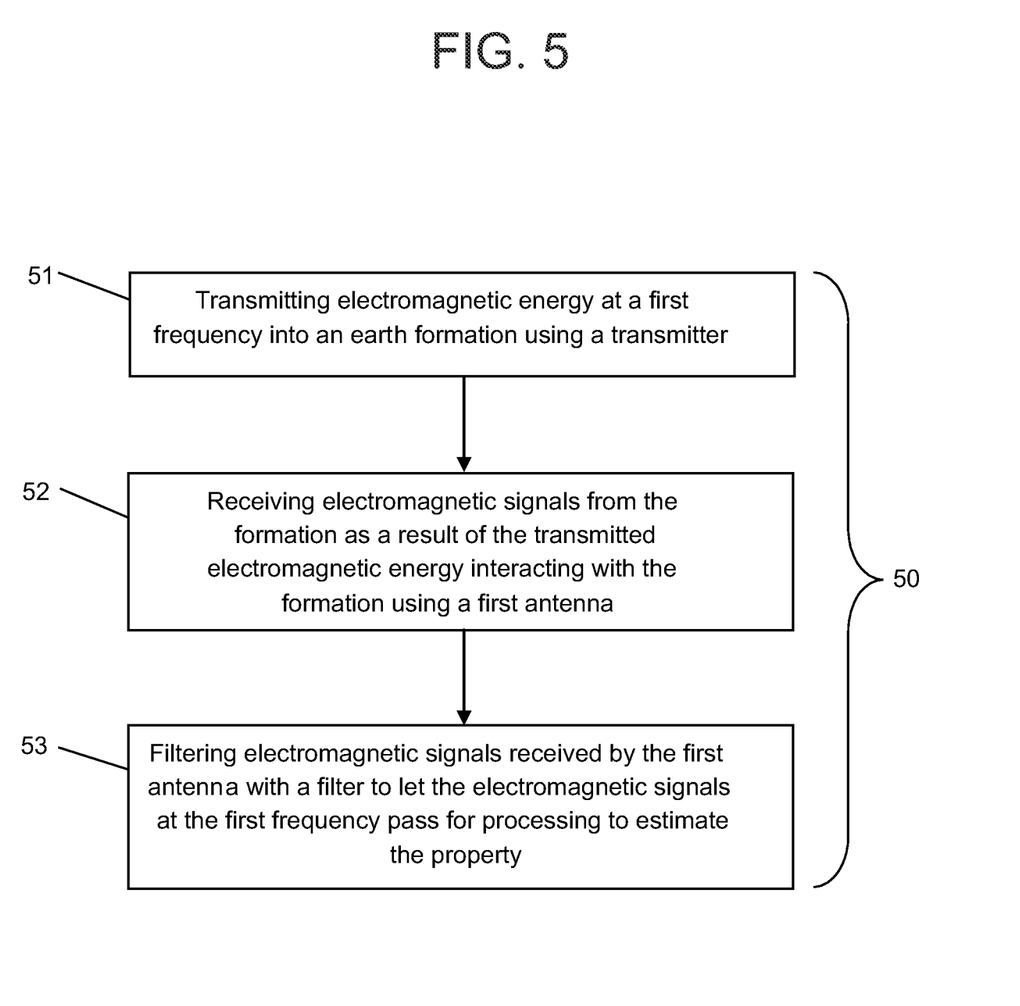
FIG. 5 presents one example of an exemplary method for estimating a property of an earth formation.

FIG. 5 presents one example of a method 50 for estimating a property of the earth formation 3 penetrated by the borehole 1. The method 50 calls for (step 51) transmitting the electromagnetic energy 16 at a first frequency into the formation 3 using the transmitter 15. Further, the method 50 calls for (step 52) receiving the electromagnetic signals 18 from the formation 3 as a result of the transmitted electromagnetic energy 16 interacting with the formation 3 using the antenna 9. Further, the method 50 calls for (step 53) filtering electromagnetic signals received by the antenna 9 with the filter 14 to let the electromagnetic signals 18 at the first frequency pass for processing to estimate the property. The method 50 can also call for stopping the transmitting of electromagnetic energy at the first frequency and the filtering of electromagnetic signals received by the antenna to let the electromagnetic signals at the first frequency pass, the stopping being performed before starting the transmitting and the filtering associated with the second frequency.

In support of the teachings herein, various analysis components may be used, including a digital and/or an analog system. For example, the downhole electronics 6, the surface processing system 7, or the controller 20 may be included the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to one component being coupled either directly to a second component or indirectly to the second component via one or more intermediate components.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, the apparatus comprising:
    a carrier configured to be conveyed through the borehole;
    a transmitter disposed at the carrier and configured to transmit electromagnetic energy at a first frequency into the formation;
    a first antenna disposed at the carrier and configured to receive electromagnetic signals from the formation that have characteristics related to the property as a result of the transmitted electromagnetic energy interacting with the formation;
    an active filter coupled to the antenna and configured to filter electromagnetic signals received by the antenna to let the electromagnetic signals at the first frequency pass for processing to estimate the property;
    a controller coupled to the transmitter and the filter and configured to direct the transmitter to transmit electromagnetic energy at a second frequency into the formation and to direct the filter to let the received electromagnetic signals at the second frequency pass for processing to estimate the property;
    wherein: the filter includes an active component configured to amplify the electromagnetic signals passing through the filter; the frequency at which the electromagnetic signals are allowed to pass through the filter is selectable; and
    the controller is further configured to direct the transmitter to stop transmitting the electromagnetic energy at the first frequency and to direct the filter to stop allowing the received electromagnetic signals at the first frequency to pass.

2. The apparatus of claim 1, wherein the property includes a resistivity, a conductivity or a combination thereof.

3. The apparatus of claim 1, further comprising a second antenna configured to receive the electromagnetic signals, wherein a difference in at least one of magnitude and phase between the electromagnetic signals received by the first antenna and the electromagnetic signals received by the second antenna are measured to estimate the property.

4. The apparatus of claim 1, wherein the filter includes an active component configured to amplify the electromagnetic signals passing through the filter.

5. The apparatus of claim 4, wherein the frequency at which the electromagnetic signals are allowed to pass through the filter is selectable.

6. The apparatus of claim 5, wherein the controller is programmed to direct the transmitter to transmit the electromagnetic energy at a plurality of frequencies and to direct the filter to pass received electromagnetic signals at frequencies that coordinate with the transmitted frequencies.

7. The apparatus of claim 5, further comprising a low noise amplifier with an input coupled to the antenna and an output coupled to the filter.

8. The apparatus of claim 5, wherein the amplifier comprises a maximum noise rating of five nanoV/√Hz.

9. The apparatus of claim 1, further comprising a transformer with an input side coupled to the antenna and an output side coupled to the filter and configured to decouple a zero frequency field from the filter.

10. The apparatus of claim 1, further comprising a mixing circuit coupled to an output of the filter and configured to mix an oscillating signal at a fixed frequency with the electromagnetic signals at substantially the first frequency that are passed through the filter to produce audio signals.

11. The apparatus of claim 1, wherein the carrier is conveyed by at least one of a wireline, a slickline, coiled tubing, and a drill string.

12. The apparatus of claim 1, further comprising a controller coupled to the transmitter to selectively vary a frequency of the first frequency.

13. The apparatus of claim 1, further comprising a controller coupled to the active filter to allow selected frequencies of the electromagnetic signals to pass the active filter.

14. The apparatus of claim 1, wherein the transmitter is configured to transmit electromagnetic energy at a plurality of frequencies.

15. A method for estimating a property of an earth formation penetrated by a borehole, the method comprising:
    transmitting electromagnetic energy at a first frequency into the formation using a transmitter;
    receiving electromagnetic signals from the formation that have characteristics related to the property as a result of the transmitted electromagnetic energy interacting with the formation using a first antenna; and
    filtering electromagnetic signals received by the first antenna with an active filter to let the electromagnetic signals at the first frequency pass for processing to estimate the property;
    transmitting electromagnetic energy at a second frequency into the formation and filtering electromagnetic signals received by the antenna to let the received electromagnetic signals at the second frequency pass for processing to estimate the property; and
    stopping the transmitting of electromagnetic energy at the first frequency and the filtering of electromagnetic signals received by the antenna to let the electromagnetic signals at the first frequency pass, the stopping being performed before starting the transmitting and the filtering associated with the second frequency.

16. The method of claim 15,
    wherein the active filter comprises a circuit having a resistor-capacitor network and an amplifier that provides feedback to the network and gain to an input signal, the active filter being configured to filter the input signal and provide gain to the input signal at the same time.

17. The method of claim 16 further comprising mixing the electromagnetic signals at substantially the first frequency that passed through the filter with an oscillating signal at a fixed frequency to produce audio signals related to a difference between the first frequency and the fixed frequency.

18. The method of claim 16, further comprising:
    receiving the electromagnetic signals with at least a second antenna;
    filtering the electromagnetic signals received by the at least a second antenna to let the electromagnetic signals at the first frequency pass for processing; and
    measuring a difference in at least one of amplitude and phase between the electromagnetic signals received by the first antenna and the electromagnetic signals received by the at least a second antenna to estimate the property.

19. The method of claim 16, further comprising transmitting electromagnetic energy at a plurality of frequencies into the formation using the transmitter.

20. A non-transitory machine-readable medium comprising machine-executable instructions for estimating a property of an earth formation penetrated by a borehole by implementing a method comprising:
    transmitting electromagnetic energy at a first frequency into the formation using a transmitter;
    receiving electromagnetic signals from the formation that have characteristics related to the property as a result of the transmitted electromagnetic energy interacting with the formation using a first antenna; and
    filtering electromagnetic signals received by the first antenna with an active filter to let the electromagnetic signals at the first frequency pass for processing to estimate the property;
    transmitting electromagnetic energy at a second frequency into the formation and filtering electromagnetic signals received by the antenna to let the received electromagnetic signals at the second frequency pass for processing to estimate the property; and
    stopping the transmitting of electromagnetic energy at the first frequency and the filtering of electromagnetic signals received by the antenna to let the electromagnetic signals at the first frequency pass, the stopping being performed before starting the transmitting and the filtering associated with the second frequency;
    wherein the active filter comprises a circuit having a resistor-capacitor network and an amplifier that provides feedback to the network and gain to an input signal, the active filter being configured to filter the input signal and provide gain to the input signal at the same time.

21. The machine-readable medium of claim 20, wherein the method further comprises:
    receiving the electromagnetic signals with a second antenna;
    filtering the electromagnetic signals received by the second antenna to let the electromagnetic signals at the first frequency pass for processing; and
    measuring a difference in at least one of amplitude and phase between the electromagnetic signals received by the first antenna and the electromagnetic signals received by the second antenna to estimate the property.

* * * * *